Oct. 8, 1935.  J. BYSTRICKY  2,016,809
LUBRICATING APPARATUS
Filed March 20, 1933  5 Sheets-Sheet 1

Inventor:
Joseph Bystricky
By
Williams, Bradbury, McCaleb & Hinkle Attys.

Oct. 8, 1935.  J. BYSTRICKY  2,016,809
LUBRICATING APPARATUS
Filed March 20, 1933   5 Sheets-Sheet 2

Inventor:
Joseph Bystricky
By Williams, Bradbury, McCall & Hinkle
Attys.

Oct. 8, 1935.   J. BYSTRICKY   2,016,809
LUBRICATING APPARATUS
Filed March 20, 1933   5 Sheets-Sheet 3

Patented Oct. 8, 1935

2,016,809

UNITED STATES PATENT OFFICE 2,016,809

LUBRICATING APPARATUS

Joseph Bystricky, Chicago, Ill., assignor, by mesne assignments, to Stewart-Warner Corporation, Chicago, Ill., a corporation of Virginia Application March 20, 1933, Serial No. 661,713

26 Claims. (Cl. 221—47.4)

My invention relates generally to lubricating apparatus, and more particularly to an improved high pressure lubricating system.

As is well known, a large number of automobiles and similar machines have their bearings regularly equipped with a lubricant-receiving fitting to which a source of lubricant under high pressure may be detachably coupled so as to force lubricant (usually grease) into the bearing under extremely high pressures, in the order of 10,000 pounds per square inch. A number of different systems of this type are at present in use, but each of these systems has one or more defects which renders it not entirely satisfactory. In one system the defect may be its high cost, in another the defect may be the inability to utilize high pressures, and in others the defect may be difficulty of operation.

Most of these lubricating systems were designed and provided with the expectation that they would be used at a maximum pressure of 2000 or 3000 pounds per square inch. In many machines, particularly automobiles, in which the lubricating operation is generally performed somewhat irregularly, the bearings will frequently become clogged or "frozen" to an extent such that a lubricant pressure of 2000 or 3000 pounds per square inch is insufficient to dislodge the caked lubricant in the bearing, and it is necessary to utilize a pressure as high as 10,000 or 12,000 pounds per square inch to accomplish this result.

In one high pressure lubricating system customarily referred to as the "push-type" system, the lubricant-receiving fitting has a contacting face defined by a circular dirt-cutting edge. In this system (disclosed in the patent to Oscar U. Zerk, No. 1,475,980), the lubricant compressor has a nozzle which is conformed and arranged to make sealing contact with the tip of the fitting merely by being pressed thereagainst. The nozzle has a spherically concave contact surface which is adapted to embrace the contact edge of the fitting and make sealing contact therewith when pressed thereagainst, even though the axis of the nozzle is held at a considerable angle relative to the axis of the fitting. This system has a large number of advantages, particularly in simplicity, low cost, and ease and rapidity of operation. It has been found extremely difficult, however, to utilize high lubricant pressures in this system, since it is necessary for the operator to hold the lubricant compressor nozzle tightly against the fitting in opposition to the high back pressure exerted by the lubricant. When the pressure is from a few hundreds to 2000 or 3000 pounds, this may be done without great difficulty, and, while it may under favorable circumstances also be done with pressures as high as 10,000 pounds per square inch, the operation of lubricating a machine equipped with the push-type system is tiring, since it requires considerable manual effort to hold the nozzle of the compressor against the fitting when the higher pressures are used.

In the system of my invention, I utilize a fitting in some respects similar to that employed in the above described push type system, and utilize a coupler for making a detachable connection with the fitting, which in some respects is also similar to the nozzle of the push type system. In my system, I have retained all of the advantages of the push type system, but have provided additional means to overcome its disadvantages.

In the system of my invention, the nozzle forms a part of an automatic coupler which is adapted to be mechanically locked to the lubricant-receiving fitting so that, having established the coupling connection, the operator need not continuously apply a force to maintain the connection. The operation of lubricating an automobile, or similar machine, is thereby rendered much easier, more certain, and more rapid than by the use of any of the high pressure lubricating systems at present in use.

It is therefore an object of my invention to provide a new and improved high pressure lubricating system employing a coupler and fitting connection which is capable of maintaining a tight seal under extremely high pressures.

A further object is to provide an improved lubricating system of the high pressure type in which the coupler may be positively locked to the lubricant-receiving fitting upon the application of lubricant pressure thereto and may readily be disconnected from the fitting upon release of pressure.

A further object of my invention is to provide an improved high pressure lubricating system in which the release of lubricant pressure causes the automatic disconnection of the coupler from the lubricant-receiving fitting.

A further object is to provide an improved automatic means for relieving the lubricant pressure at the coupler upon completion of a lubricating operation.

A further object of my invention is to provide an improved form of coupling connection for high pressure lubricating apparatus.

A further object of my invention is to provide an improved coupler for high pressure lubricating apparatus.

A further object of my invention is to provide an improved high pressure lubricating system which may be used to force lubricants under extremely high pressures to the bearings to be lubricated, the parts of which are simple in construction, may be economically manufactured, and which may be easily operated.

Other objects will appear from the following description, reference being had to the accompanying drawings, in which.

Figures 1, 1A:
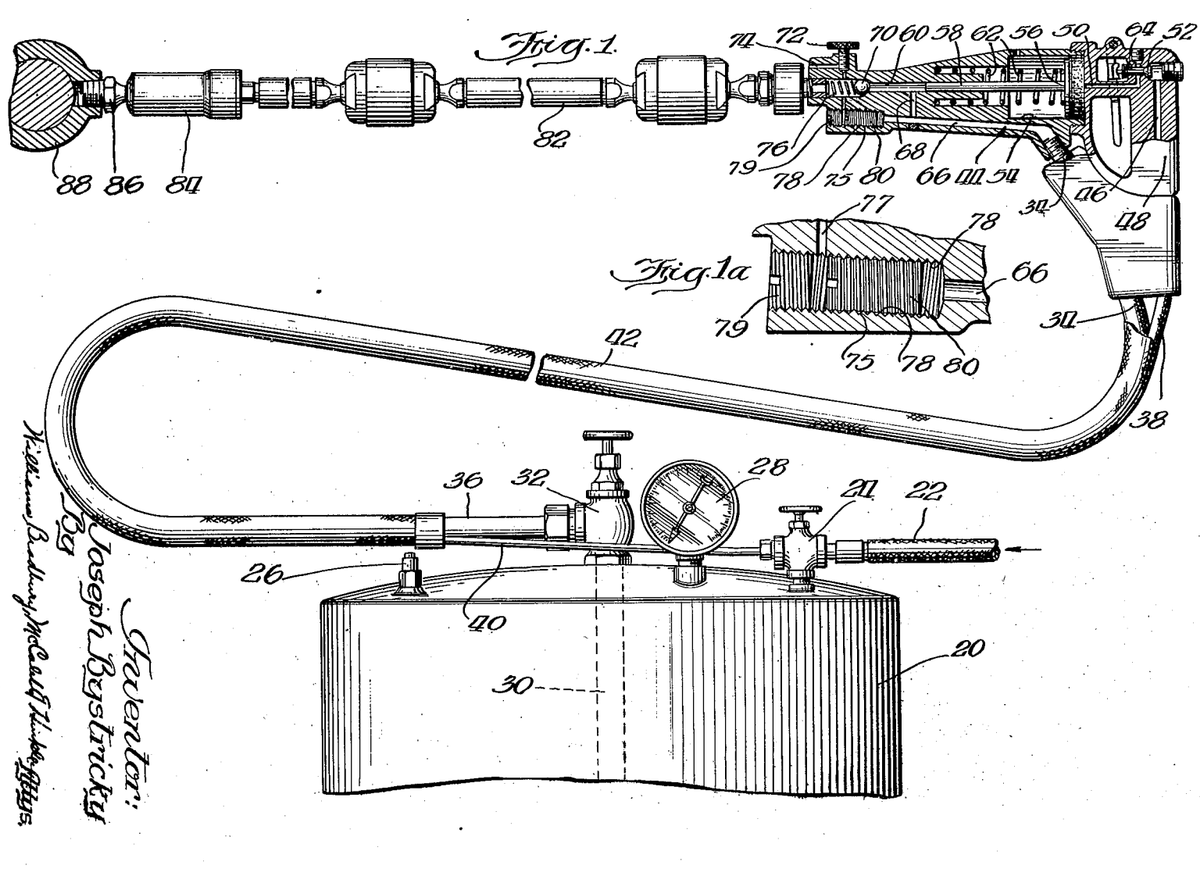
Figure 1 is an elevation of a complete power-operated lubricating system embodying my invention, portions of the high pressure booster being shown in central vertical section.
Figure 1a is an enlarged sectional view of the pressure relief by-pass means.

In installations of the lubricating system of my invention at automobile service stations, garages, and other places where a large number of bearings are to be lubricated, a power-operated lubricant compressor of the general type illustrated in Fig. 1 will usually be employed. The compressor may, of course, be operated by compressed air, electric motor, gasoline engine or other suitable source of power, and the compressor illustrated in Fig. 1 is therefore intended to be illustrative of any suitable power-operated compressor incorporated in the system of my invention.

In this system, the lubricant is supplied from a container 20, usually in the form of a large tank, and is maintained under pressure by compressed air supplied through a hose 22 connected to a valve 24. The latter is connected to the interior of the tank and may be used to control the admission of air under pressure to the tank. A suitable blow-off or safety valve 26 may be provided to prevent excess pressure within the tank, and a pressure gauge 28, to indicate pressure within the tank, may also be provided. Lubricant is forced from the container 20 through a pipe 30 which extends through the container and has an angle globe valve 32 at its upper end. The pipe 30 will, of course, extend to substantially the bottom of the container 20. A hose 34 is connected to a suitable nipple 36 coupled to the globe valve 32 and an air hose 38 is connected to a pipe 40 which is coupled to the valve 24. The hose 34 and 38 are preferably bound together by a fabric covering 42.

The ends of the hose 34 and 38 are connected to a compressor or "booster" 44, which may be of any suitable construction. In the embodiment illustrated, the air hose 38 is connected to an air passageway 46 formed within the handle portion 48 of the booster. Flow from the passageway 46 to a duct 50 is controlled by a manually operated valve 52. The duct 50 leads to an air cylinder 54, in which a piston 56 is reciprocable. The piston carries a plunger stem 58, which is reciprocable in a plunger cylinder 60. A compression coil spring 62 motivates the piston on its return stroke, when the pressure in the air cylinder is released by closing the valve 52 and opening the valve 64, the latter serving to connect the duct 50 to the atmosphere.

The grease hose 34 is connected to a passageway 66 formed in the body 44 of the booster. An inlet duct 68 connects the passageway 66 with the plunger cylinder 60. The end of the plunger cylinder 60 is closed by an outlet check valve 70.

In utilizing a booster of this type with the system of my invention it is desirable, if not necessary, to provide means for relieving the lubricant pressure in the discharge conduit. One such means is illustrated in Fig. 1 as comprising a manually operable needle valve 72 which, when open, will relieve the pressure in the discharge conduit by opening a passageway 74 leading from the outlet check valve chamber 76 to the atmosphere. By opening this valve, the pressure in the discharge conduit may, of course, be reduced substantially to atmospheric pressure. This arrangement for releasing the pressure is not wholly satisfactory, inasmuch as a certain quantity of lubricant is discharged to the atmosphere each time the pressure is released. The discharged lubricant is wasted and smears over parts of the compressor and drops therefrom and generally renders the lubricating operation untidy. I have, therefore, provided an additional pressure relieving means which will normally be effective in reducing the pressure in the discharge conduit sufficiently to permit disconnection of the coupler.

This pressure relieving means comprises a highly restricted by-pass from the discharge check valve chamber 76 to the passageway 66. In Figs. 1 and 1a this by-pass is shown in the form of a long helical passageway 75, substantially triangular in cross section, formed between a threaded bore 78, and a plug 80. The plug has mutilated external threads, that is the apex of the thread is ground off, or stated differently, the maximum diameter of the plug is less than root diameter of the threaded bore 78 and slightly greater than the least diameter of the internal threads in said bore. The outer end of the bore 78 is closed by a tightly fitting plug 79. One end of the bore 78 communicates with the passageway 66 while the other end communicates with the valve chamber 76 through a drilled passageway 77.

The passageway 75 thus permits a very small quantity of lubricant to flow from the valve chamber 76 to the passageway 66 whenever the pressure in the former is greater than the pressure in the latter. This slight flow of lubricant will cause the pressure in the discharge conduit to drop to a pressure approximately that in the passageway 66 within a very short time after the cessation of operation of the booster. The flow through the passageway 75 will not, however, be sufficiently great appreciably to lessen the quantity of lubricant discharged by the booster during its operation.

Other suitable means may be provided to relieve the pressure in the discharge conduit. It is preferable however that the means used be automatic in operation and further that the lubricant be not vented to the atmosphere.

In Fig. 1, the discharge conduit is illustrated as a flexible ball-jointed hose 82 of the type shown in the W. F. Hundemer Patent No. 1,603,916. The coupler 84 of my invention is secured to the end of the hose 82 and is shown as connected to a lubricant-receiving fitting 86 threaded in the oil hole of a bearing 88 to be lubricated.

Figure 2:
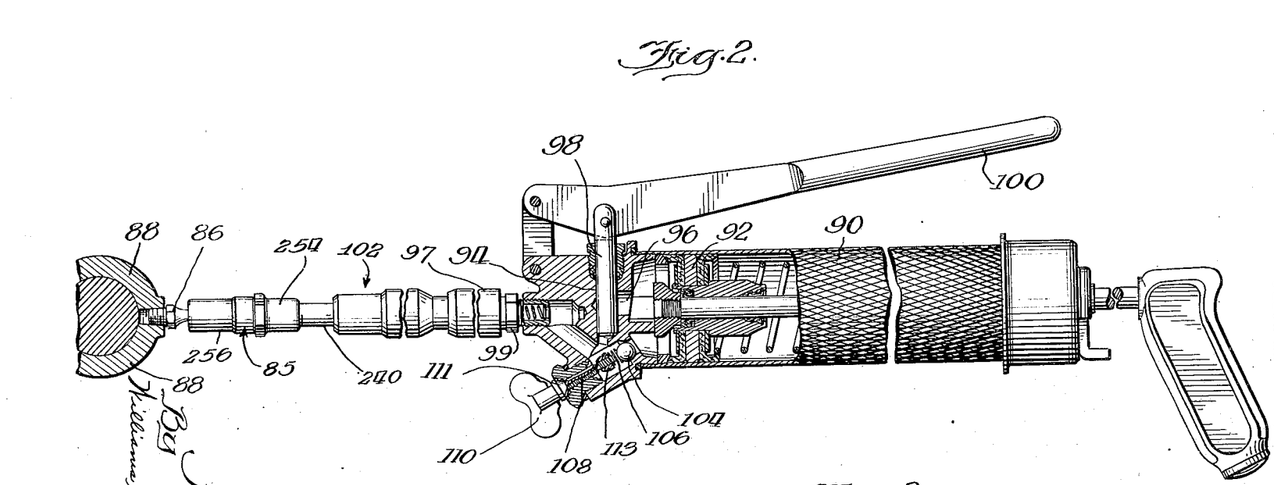
Figure 2 is an elevational view of my improved lubricating system, in which the compressor is hand operated, portions of the compressor being shown in central vertical section.

The system of my invention may also have a hand operated lubricant compressor incorporated therein, as illustrated in Fig. 2. The compressor there shown is of well known construction, being illustrated in the patent issued to George F. Thomas and Joseph Bystricky, Patent No. 1,968,231, July 31, 1934.

The compressor comprises a barrel 90 for containing lubricant, the lubricant being forced from the barrel by a spring-pressed follower piston 92 into the high pressure cylinder 94 through an inlet port 96.

A plunger 98 is manually reciprocable by means of the lever 100 to eject lubricant from the cylinder 94. A coupler 85 of my invention (shown in detail in Figures 12, 13, and 15 and described hereinafter) is secured to the end of the booster 102 and is illustrated as being connected to a fitting 86 screwed into the oil hole of a bearing 88. This compressor has a by-pass valve 104 held against its seat by a spring 106. The abutment for the spring comprises the end of a threaded stem 108, longitudinally slotted, which may be rotated by means of a wing handle 110.

The stem 108 has a vent valve 111 which, upon unscrewing the stem 108, will be opened to permit venting of the lubricant from the discharge passageway of the grease gun, through the slot in the stem, to the atmosphere. A valve 113, similar to the valve 111, is also secured to the stem 108 and adapted to close when the stem has been unscrewed to its maximum extent.

When the booster 102 is being used, the stem 108 will be unscrewed to bring the valve 113 against its seat and to permit the ball 104 to move away from its seat. Thereupon lubricant may be forced directly from the barrel 90 by the spring pressed piston 92 to the booster 102. Under these circumstances, the pressure in the booster will be relieved automatically upon the retractile stroke of the booster. However, if the pressure is not sufficiently relieved to permit uncoupling, the valve stem 108 may be rotated so as to raise the valve 113 slightly from its seat and permit escape of lubricant through the slot in the stem 108 to the atmosphere. Ordinarily, it will be sufficient to reduce the pressure to that present in the barrel 90, but under certain unusual circumstances it may be desirable to vent the gun to the atmosphere. Usually, when using the booster 102 with the compressor, the valve 113 will be screwed firmly against its seat, and lubricant forced to the bearing by pushing it toward the fitting to operate the booster, without operating the plunger 98.

Figure 2A:
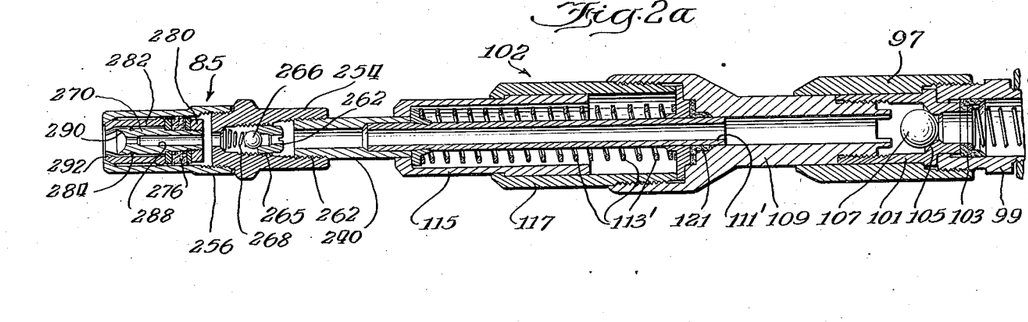
Figure 2a is an enlarged vertical sectional view of the booster nozzle of the lubricant compressor shown in Figure 1, showing a preferred form of coupler attached thereto.

As shown in Fig. 2a, the booster 102 comprises a union part 97 which is threaded to the discharge nipple 99 and has a male coupling part 101 engageable in the nipple 99. A spring pressed cup washer 103 seals the coupling connection. The part 101 has an inlet check valve seat 105 for the loose check valve 107 and is threaded to a high pressure cylinder 109. A hollow plunger 111' is reciprocable in the bore of cylinder 109 and at its outer end carries the coupler 85. The plunger is pressed outwardly by a spring 113' and is guided by a pair of telescoping sleeves 115, 117 secured to the plunger and cylinder respectively. A seal around the plunger is effected by a hat-shaped leather packing 121 held in place by a washer 123.

As the lubricant compressor is pushed toward the fitting to be lubricated, the pressure developed by the relative movement of the plunger 111' and cylinder 109 forces the check valve 107 against its seat and causes operation of the clamping mechanism of the coupler 85. Upon retraction of the compressor the pressure within the cylinder 109 drops below atmospheric pressure and a new charge of lubricant is drawn into the bore of the cylinder past the check valve 107. The pressure in the coupling is, however, not immediately relieved due to the incorporation therein of a check valve 266 and a high resistance by-pass 265 described in detail hereinafter, and the coupling will therefore remain clamped to the fitting between successive discharge strokes of the compressor.

Figures 3, 4, 5:
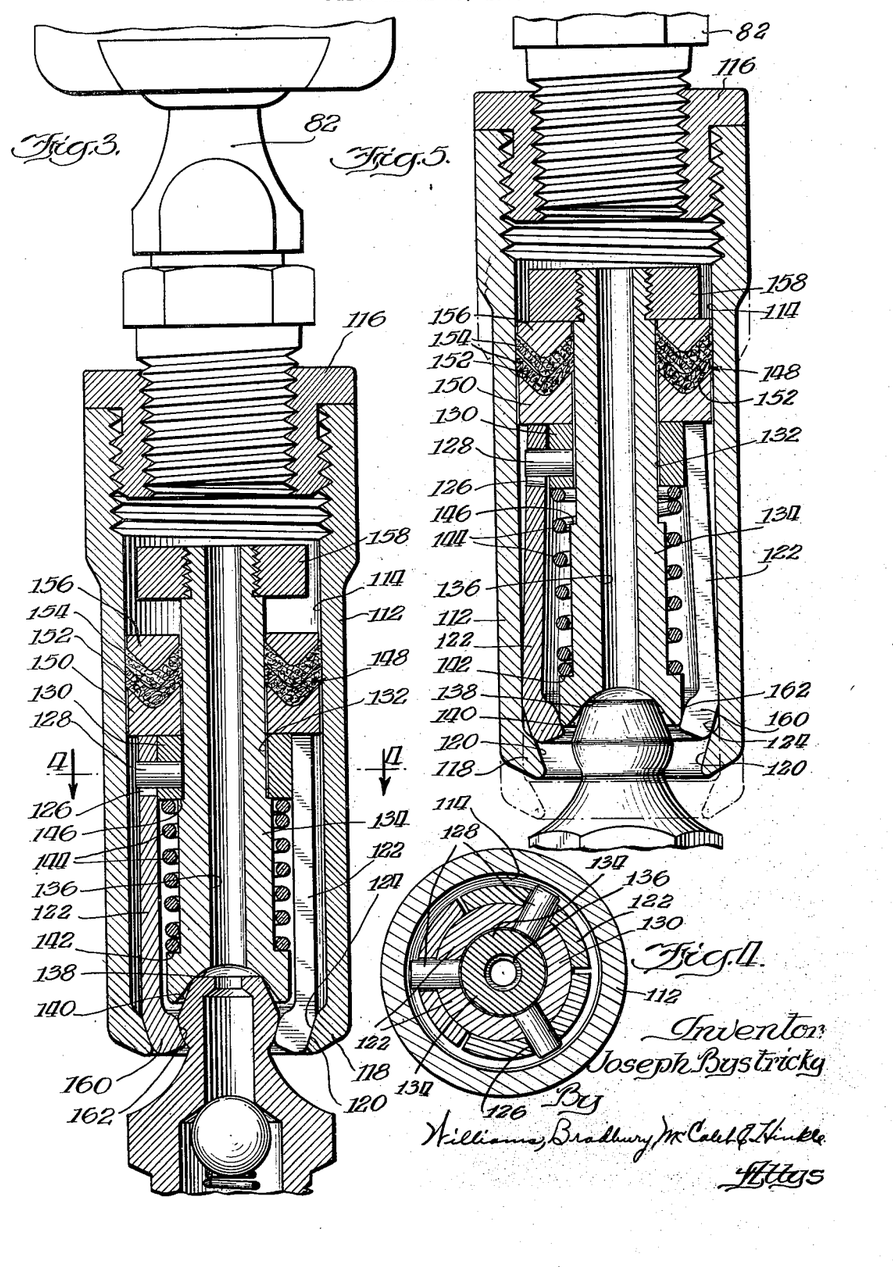
Figure 3 is an enlarged central vertical section of a modified form of my improved coupler shown coupled to a lubricant-receiving fitting.
Figure 4 is a transverse sectional view taken on the line 4—4 of Figure 3.
Figure 5 is a view similar to Figure 3, showing the parts in uncoupled position.

The coupler of my invention, in the form shown in Figs. 3, 4, and 5, comprises a substantially cylindrical body 112 which has a cylindrical bore 114. The body at the upper end of the bore 114 is threaded to receive the end of the hose 82, which is illustrated as being connected by means of a threaded bushing 116. The lower end of the body has an inwardly extending flange 118, provided with a frusto-conical inwardly tapering surface 120. This surface forms, in effect, a cam for three jaws 122 which are provided with complementary camming surfaces 124.

The jaws 122 are provided at their upper ends with apertures 126, through which pins 128 project, the latter being rigidly secured in a ring 130 and being of slightly lesser diameter than the apertures 126. The ring 130 is freely reciprocable upon the reduced diameter portion 132 of a nozzle element 134.

The nozzle element 134 has a central bore 136, the lower end of which has a bell mouth formed by a concavely spherical surface 138 and a flaring conical surface 140. The nozzle element 134 has a shoulder 142 forming a seat for a compression spring 144, the upper end of which abuts against the ring 130. The degree of compression of the spring 144 is limited by the engagement of the ring 130 with a stop shoulder 146.

An annular piston 148 is composed of a metallic ring 150 having a trough-like groove 152 in its upper surface to receive a pair of annular packing washers 154, which are V-shaped in cross-section. The packing washers 154 are held in place by a metallic ring 156, the lower portion of which is V-shaped in cross-section to fit into the upper packing washer 154 and maintains the packing washers spread in lubricant sealing contact with the walls of the bore 114 and the external surface of the portion 132 of the nozzle element. A nut 158 is threaded at the upper end of the nozzle element 134 and serves as a stop to limit movement of the latter in both directions. The jaws 122 have thickened gripping portions 160 provided with inwardly facing surfaces 162 substantially in the form of portions of the surface of a cone.

The type of fitting with which the above described coupler is adapted to be used is best illustrated in Figs. 6 to 9, inclusive, and comprises a tubular body having a threaded shank 164, a hexagonal wrench-engaging portion 166, a generally conical portion 168 and a head 170. The head has a flat tip surface 172 bounded by a relatively sharp dirt-cutting edge 174. While, in theory, the edge 174 should be very sharp, in practice it is found desirable slightly to round this edge, as indicated by the construction lines shown in Fig. 9. The radius of curvature of this edge 174 is extremely small, preferably approximately one-twelfth of the diameter of the contact face 172, so that there will be substantially a "line" contact between the fitting and the concavely spherical surface 138 of the nozzle element.

The upper half 176 of the head of the nipple is substantially frusto-conical in shape, to aid in guiding the coupler into engagement with the fitting. The lower half of the head has a substantially spherical surface 178, the radius of curvature of which is substantially the same as that of the spherical surface 138 of the nozzle, and the dirt cutting edge 174 lies substantially in the surface of the sphere defined by the spherical surface 178. The portion 168 has a surface of revolution formed by a curved line rotated about the axis of the fitting.

Figures 6, 7, 8, 9, 10, 11:
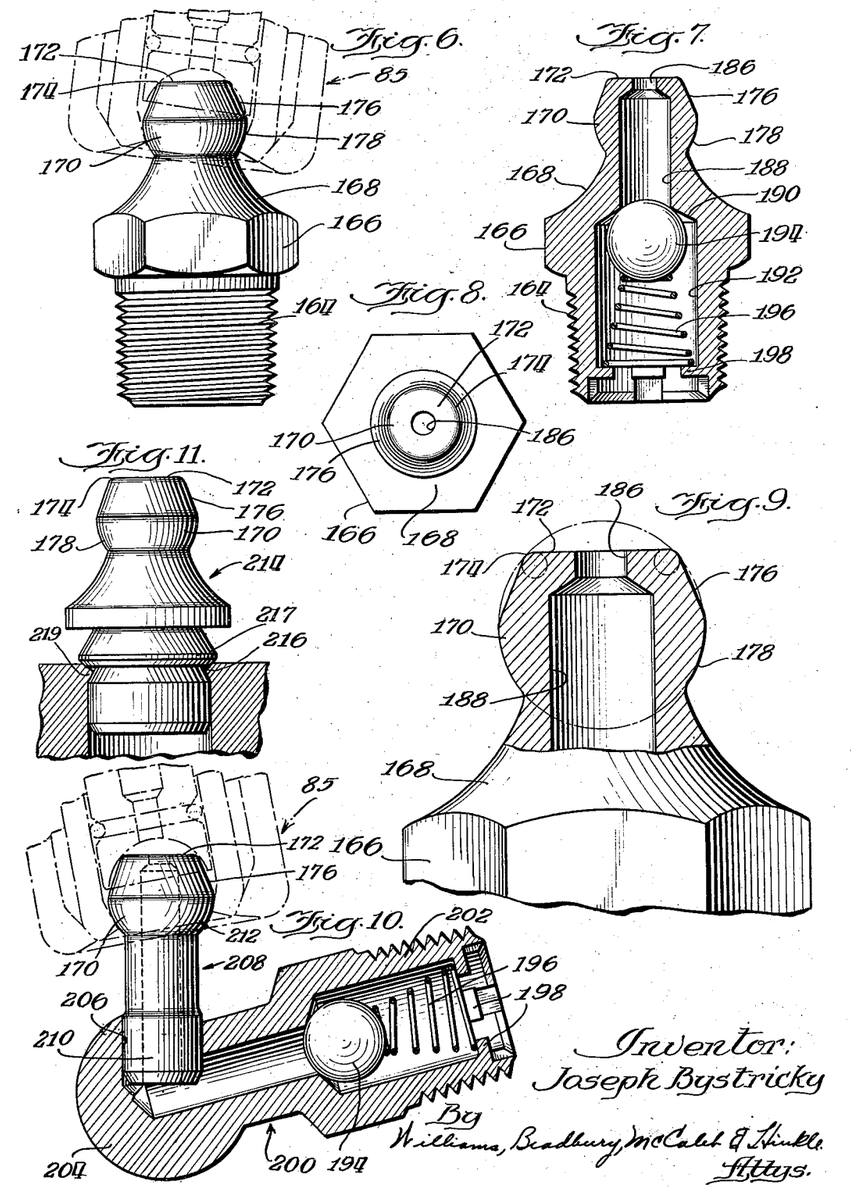
Figure 6 is an enlarged elevation of the fitting, the possibile angularity which may be assumed by the coupler being illustrated in dotted lines.
Figure 7 is a central vertical sectional view of the fitting shown in Figure 6.
Figure 8 is a plan view of the fitting shown in Figure 6.
Figure 9 is an enlarged central vertical sectional view of the head portion of the fitting.
Figure 10 is a side view, partly in section, showing an angle fitting.
Figure 11 is an elevation of a modified form of fitting.

The fitting is provided with an inlet opening 186, of extremely small diameter, which communicates with a larger bore 188. A frusto-conical valve seat surface 190 forms a shoulder between a still larger bore 192 and the bore 188 and serves as a seat for a ball check valve 194, which is pressed thereagainst by a conical compression coil spring 196. The spring is held within the bore 192 by a plurality of lugs 198, which are preferably struck inwardly from the end of the fitting. It will be apparent that in a number of details the fitting is similar to that disclosed in the patent to Oscar U. Zerk, No. 1,619,455, dated March 1, 1927.

In Fig. 10 I have illustrated a fitting suitable for use where the bearing is located in a position such that it would be difficult or impossible to connect the compressor thereto if an ordinary straight fitting, such as shown in Figs. 6 to 9, were employed. The fitting comprises a body 200 having a threaded shank 202 and a substantially spherical head 204. The body 200 is bored and provided with a ball check valve, in a manner similar to the body portion of the fitting illustrated in Fig. 7. The head 204 has a hole 206 drilled therein at an acute angle relative to the axis of the fitting. The fitting tip 208 has a shank 210 which is formed for a press fit in the hole 206, and has a head 212, shaped similarly to the head of the fitting ilustrated in Figs. 6 to 9.

If desired, the fittings of the type shown in Figs. 6 to 9, inclusive, may be formed with a drive shank, as illustrated in Fig. 11, wherein the fitting 214 has a head and a generally conical portion similar to the previously described fitting, and a hardened shank portion formed with groove 216 and ledge 217. When the fitting is forcibly driven into the oil hole of a bearing 88, a portion 219 of the bearing will be swaged into the groove 216 by the ledge 217 and thus tightly lock the fitting in place. This type of drive shank and the method employed in driving it in place are more fully disclosed in the copending application of Adiel Y. Dodge, Serial No. 591,536, filed February 8, 1932.

The embodiment of my invention shown in Figs. 12, 13, 14 and 15 is the simplified and preferred form. The coupler shown is attached to a substantially conventional push-type lubricant compressor comprising a barrel 230 having a cap 232 threaded thereto. A piston 234 is secured to a piston stem 236 and is reciprocable within the barrel 230, a handle 238 being secured to the extremity of the piston stem 236. A high pressure discharge tube 240 is guided for reciprocation in a bushing 242 threaded in a lower cap 244 secured to the barrel 230. A suitable packing 246 forms a seal around the discharge tube 240. A plunger 248 is secured to an apertured plate 250 which is clamped between the barrel 10 and the cap 244. A compression coil spring 252 is compressed between the discharge tube 240 and the apertured plate 250 and normally holds the tube in the position shown in Fig. 14.

Figures 12, 13, 14, 15:
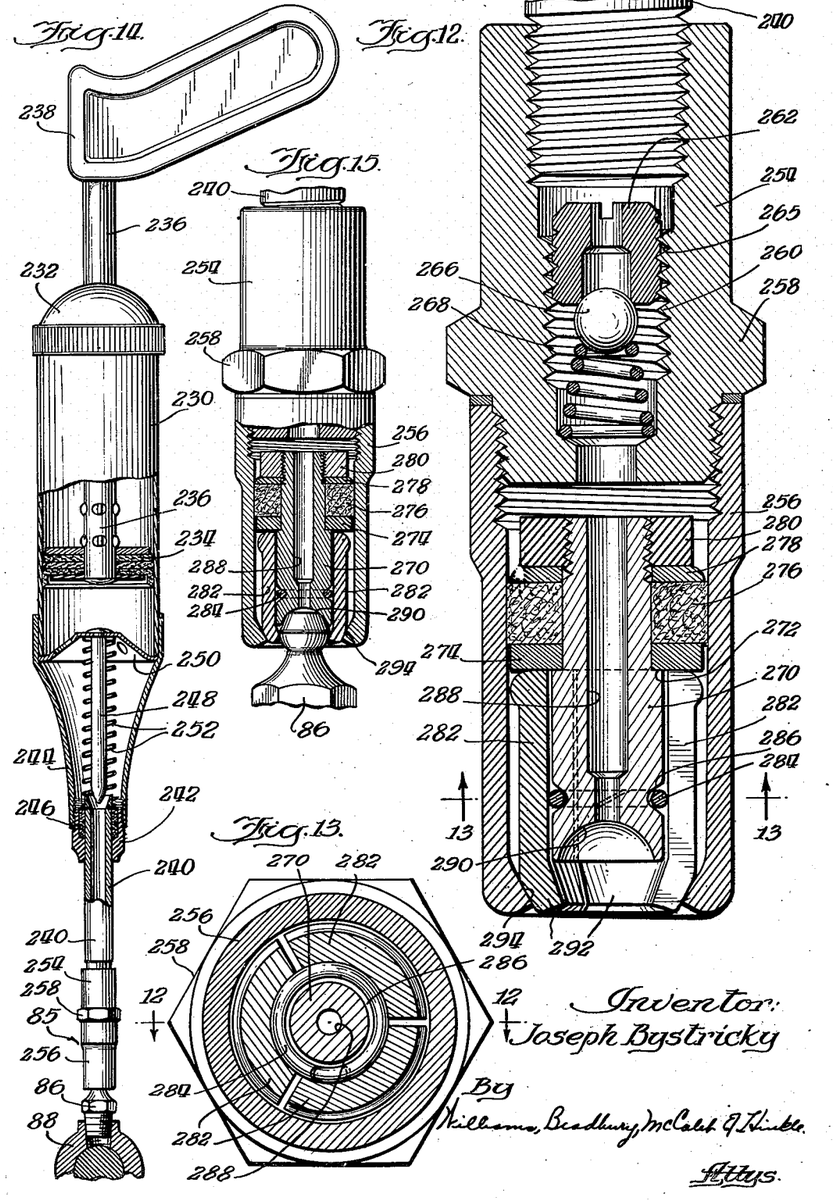
Figure 12 is an enlarged central vertical sectional view of the preferred form of the coupler of my invention.
Figure 13 is a transverse sectional view thereof taken on the line 13—13 of Figure 12.
Figure 14 is an elevation of a push-type lubricant compressor connected to a fitting, parts thereof being shown in section to illustrate the operating parts.
Figure 15 is an enlarged longitudinal sectional view showing the coupler connected to a lubricant-receiving fitting.

Assuming that the barrel 230 is partially filled with lubricant, this lubricant will be placed under low pressure upon applying the coupling to a fitting and manually pushing the handle 238 toward the fitting. Until sufficient force is applied to overcome the initial compression of the spring 252 the lubricant in the lower end of the barrel 210 will be forced under low pressure into the cylindrical bore of the discharge tube 240. Thereafter the handle is pressed with greater force in the direction of the fitting, causing the discharge tube 240 to move inwardly. During this inward movement, the plunger 248 displaces the lubricant within the cylindrical bore of the discharge tube 240 and ejects it to the bearing to be lubricated. Upon discontinuing the application of manual force to the handle 238, the spring 252 will force the barrel and its connected parts away from the fitting until the inlet end of the cylindrical bore in the discharge tube 240 is uncovered and lubricant permitted to flow into the cylindrical bore, priming it for the next operation. Of course a check valve is provided in the discharge end of the tube 240 to prevent return flow of lubricant.

The preferred form of coupler, best shown in Figs. 12, 13, and 15, comprises a connecting section 254, one end of which is threaded to receive the end of the discharge tube 240, and the other end of which is externally threaded to receive the sleeve-like coupler body 256. The connecting section 254 has a hexagonal portion 258 by which it may be engaged by a wrench in attaching it to the discharge tube 240, and has a threaded bore 260 into which is screwed an apertured plug 262. The thread on the plug 262 has its apex ground off so that when it is screwed into the bore 260, a helical passageway 265 which is substantially triangular in cross section will be formed between the plug and the connecting section. A ball check valve 266 is normally pressed against the lower end of the opening in the plug 262 by a compression spring 268.

A nozzle 270 has a shoulder 272 formed thereon, the shoulder forming a seat for a backing plate 274 of a piston packing 276, the latter being made of leather or any other suitable material. The piston packing 276 is compressed by a facing washer 278 pressed against the upper surface of the packing by a nut 280 threaded over the upper end of the nozzle 270.

A plurality of clamping jaws 282 are confined between the nozzle 270 and the body 256 of the coupler, being normally pushed away from the axis of the nozzle by a C spring 284 which fits in a groove 286 formed in the external surface of the nozzle 270. The nozzle has an axial bore 288, the lower end of which is of reduced diameter and opens into a bell mouth having a substantially spherical contact surface 290. The clamping jaws 282 at their lower ends have conical camming surfaces 292 which are engageable with the complemental conical surface 294 formed at the lower end of the coupler body 256.

In the usual push type lubricant compressor, it is necessary that the cross-sectional area of the high pressure plunger be made of greater diameter than the diameter of the tip of the fitting with which the compressor is used. The reason for this is that the force applied to the plunger must be greater than the total back pressure exerted at the nozzle, otherwise the nozzle would be pushed away from the fitting by the lubricant pressure, and leakage would occur.

With the system of my present invention, there is substantially no limitation upon the degree of pressure which may be used, and the size of the high pressure plunger in combinations such as shown in Fig. 14 may be made of as small diameter as is compatible with the volumetric requirements of the compressor and good engineering design, since obviously the force holding the nozzle against the fitting is always greater than, and substantially proportional to, the lubricant pressure developed.

When using the compressor, coupler, and fitting combination, particularly as illustrated in Fig. 14, greater pressures may be developed than with the ordinary push type lubricant compressor nozzle and fitting combination because of the greater ease with which the compressor may be operated. The operator does not have to guard against accidental displacement of the nozzle from the fitting, and thus may concentrate his effort upon the lubricant discharge stroke of the compressor. In using the compressor in the lubrication of automobiles in which a large number of the fittings are usually located beneath the car, the lubrication operation is greatly simplified since the compressor, having been coupled to a fitting will hang therefrom and be supported thereby, and the tendency of the nozzle to slip from the fitting, which is a disadvantage of the usual push-type system, is entirely eliminated.

In the push type compressor, the effectiveness of the sealing contact between the nozzle and the fitting is greatly reduced during the retractile stroke of the compressor because, during this retractile stroke, the nozzle is held in contact with the fitting only by the force of the spring in the compressor. In the system of my present invention, the force tending to maintain contacts between the nozzle and the fitting, being at all times proportional to the lubricant pressure, is sufficient to maintain a tight seal during the retractile as well as the discharge stroke of the compressor. As a result, leakage of lubricant from between the nozzle and fitting, which frequently occurred with the use of the push type system, is eliminated.

In the lubrication of various machinery the fittings are often of necessity placed in relatively inaccessible positions, and the fact that exact axial alignment of the fitting and coupler is not necessary in the system of my invention adds greatly to its practicalness and utility.

When using the compressor shown in Fig. 14 is it necessary merely to grasp the handle 238 with one hand and apply the coupling 85 to the fitting 86. The handle is then pushed toward the fitting, thus causing the barrel to slide forwardly upon the high pressure cylinder and discharge tube 240 whereupon the plunger 248 will force lubricant under high pressure into the coupler 85. The lubricant pressure will cause the outer sleeve 256 of the coupler to be pushed away from the fitting, thus camming the jaws 282 inwardly around the head of the fitting and locking the coupler to the fitting. At the same time the lubricant pressure forces the nozzle portion 270 firmly against the tip of the fitting so that a lubricant-tight seal is effected between the circular dirt-cutting edge 174 of the fitting and the concave spherical contact surface 290 of the nozzle. The compressor and coupler may be shifted slightly relative to the axis of the fitting without affecting the seal between the nozzle and the fitting. This is because the radius of curvature of the concave spherical surface 290 of the nozzle is substantially the same as the spherical surface 178 of the fitting and because the nozzle is maintained firmly pressed against the fitting by the lubricant pressure.

Upon the discharge stroke of the compressor the lubricant flows readily past the check valve 266, and upon the retractile stroke a small quantity of lubricant will leak back to the bore of the high pressure cylinder 240 through the helical by-pass 265 formed between the plug 262 and the threaded bore 260 of the connector 254. If the discharge strokes of the compressor follow in close succession the return flow through the by-pass 265 will not cause sufficient reduction of the lubricant pressure within the external coupling sleeve 256 to cause uncoupling, and the compressor may be pulled with a considerable force in a direction away from the fitting without separating the coupling from the fitting. If, however, it is desired to detach the coupler from the fitting, it is necessary merely to swing the compressor through a slight angle relative to the axis of the fitting, whereupon the jaws will be forced out of clamping engagement with the fitting and permit the coupler to be detached from the fitting with ease.

With the lubricant compressor and coupler shown in Fig. 14 it is possible to develop very much higher pressures than can be obtained in a lubricant compressor equipped with a push-type nozzle even though the latter has a plunger of the same diameter. This is due to the fact that when the compressor is positively clamped to the fitting the operator can direct his muscular energy much more effectively to push the compressor toward the fitting than if his attention and effort must be expended in taking care that the nozzle remains in contact with the fitting, as well as to apply the force necessary to push the plunger into the discharge cylinder. In addition to the fact that higher pressures can be developed because of the greater ease with which the workman's energy may be applied effectively to the compressor, the system of my invention has the additional inherent advantage that the size of the high pressure plunger of the compressor is not limited by the size of the contact face of the fitting, as is the case with the well known push-type system, but the plunger may be made of any desired diameter. There is thus no theoretical limit upon the degree of pressure which the gun may be designed to develop. Of course, in practice the plunger is made of such size that a reasonable quantity of lubricant may be delivered to the bearing upon each discharge stroke of the compressor at a sufficiently high pressure to force the lubricant into any bearing which may normally be encountered. With the compressor of my invention, which is thus capable of developing such high pressures, the frequently encountered necessity of disassembling the bearing in order to clean it to remove the caked and gritty deposit, is unnecessary since the high pressures developed will be effective to force this material from the bearing without disassembling the bearing parts.

In the operation of the lubricating system of my invention employing the coupler shown in Figs. 3, 4, and 5, the coupler is first applied to the fitting, with the parts in the position shown in Fig. 5. Downward pressure is then exerted upon the coupler body 112 to move the latter to the position in which it is shown in dotted lines in Fig. 5. Then upon application of lubricant pressure, the piston 148 will be forced downwardly, moving the clamping jaws downwardly until the ring 130 abuts against the shoulder 146. The jaws will then be in the position in which they are shown in Fig. 3. Immediately thereafter, the lubricant pressure will force the coupling body 112 upwardly and its inclined camming surface 120 will engage the complementary surfaces 124 of the clamping jaws and force the latter inwardly into tight engagement with the substantially spherical surface 118 of the fitting. While in this position, the nozzle element 134 will be firmly pressed against the tip of the fitting, the concavely spherical surface 138 and the dirt-cutting edge 174 forming a lubricant-tight connection, so that lubricant may thereafter flow through the bore 136 of the nozzle element 134 into the lubricant-receiving fitting and therefrom to the part to be lubricated.

After a sufficient quantity of lubricant has been supplied to the part to be lubricated, the pressure in the discharge conduit, and hence in the coupler, is released either through the needle valve 72 or through the by-pass 78 in the power operated grease gun of Fig. 1, or by opening the valve 111 in the manually operated grease gun illustrated in Fig. 2 by turning the stem 108 by means of the wing handle 110. When the pressure has been released, the coupler may be detached by swinging it through a small angle relative to the fitting to loosen the coupler jaws, whereupon the spring 144 will force the ring 128, clamping jaws 122 and piston 148 upwardly to the position in which they are shown in Fig. 5. As soon as the jaws have been loosened and forced upwardly by the spring 144, the coupler may be bodily removed from the fitting to which lubricant has been supplied and applied to the fitting on the next part to be lubricated.

As illustrated by the portions of the coupler shown in dotted lines in Figs. 6 and 12, it is not necessary to have the coupler in exact axial alignment with the fitting. The coupling connection may be made satisfactorily, even though the axis of the coupler is at a relatively large angle to the axis of the fitting. This adjustability makes it easy to connect the coupler to a fitting located in a comparatively inaccessible position. Furthermore, the coupler and fitting when connected together form substantially a ball and socket connection. Thus the lubricant compressor may be moved through a considerable angle during its operation and yet maintain the sealed connection with the fitting. If the connection were not thus flexible, the operator might break the fittings by inadvertently swinging the lubricant compressor out of its alignment with the fitting. This could happen because of the great leverage through which a force directed sidewardly near the end of the compressor, or upon its handle, would be communicated to the fitting, as for example when using a compressor of the type shown in Fig. 2.

When the bearing being supplied with lubricant does not offer appreciable resistance to the flow of lubricant, the nozzle 134 will be pushed upwardly until it contacts with the bushing 116. The lubricant will then flow to the bearing if the nozzle is held against the fitting with sufficient force to overcome the lubricant back-pressure tending to push the body part 112 of the coupler away from the fitting, without causing the jaws to grip the fitting. Under these circumstances, the nozzle will cooperate with the fitting in the same manner as is employed in the prior art push-type compressors such as disclosed in the aforesaid Zerk Patent No. 1,475,980.

In some instances, when the bearing does not offer appreciable resistance to the inflow of lubricant, the jaws will not be clamped about the fitting for the lubricant back-pressure in the coupler will not be sufficient to actuate the clamping jaws. This might occur when lubricant is being forced into a fitting which is not provided with a check valve. The check valve in the fitting will usually offer sufficient resistance to the flow of lubricant to cause the operation of the coupler clamping jaws.

It has been found that with the lubricating system of my present invention, the lubrication of machinery may be expedited, the operation made less tiring, and the lubrication of the machine accomplished with greater thoroughness and with practically no wastage of lubricant. The fittings and couplers may be economically manufactured and are very rugged and durable.

While I have shown and described a particular embodiment of my invention, it will be apparent to those skilled in the art that various modifications in design and construction may be made without departing from the spirit of my invention.

What I claim as new and desire to secure by Letters Patent of the United States is:

1. In combination, a high pressure lubricant compressor, a discharge conduit therefor, automatically operable means for relieving lubricant pressure in said discharge conduit, and coupling means secured to the end of said discharge conduit, said coupling means comprising a nozzle element arranged for making a sealed connection with a lubricant receiving fitting when applied thereto at any one of a plurality of angular positions relative to the axis of the fitting, lubricant pressure operated clamping means for locking said coupling means to the fitting, and flow restricting by-pass means between the coupling means and the compressor, said by-pass means permitting slow return flow of lubricant from said coupling means to said discharge conduit, thereby to relieve the lubricant pressure upon said clamping means and permit disengagement of the coupling means from the fitting upon completion of a lubricating operation.

2. High pressure lubricating apparatus, comprising a lubricant compressor having a discharge conduit, means for discharging lubricant into said conduit under high pressure, and means for relieving the pressure in said conduit; a lubricant receiving fitting having means for attaching it to a part to be lubricated and an enlarged diameter head and a contact tip bounded by a circular dirt-cutting edge; and a coupler connected to said conduit, said coupler having a nozzle element with a substantially concave mouth for sealing contact with the tip of said fitting, a plurality of jaws arranged for engagement beneath the enlarged head of said fitting, and a piston reciprocable in said coupler and operable upon application of lubricant pressure thereto to force said jaws into clamping engagement with said fitting, and a check valve device constructed and arranged to permit rapid flow of lubricant under pressure from said conduit to said coupler.

3. In a high pressure lubricating system of the type in which a high pressure lubricant compressor is successively connected to lubricant receiving nipples attached to parts to be lubricated, a coupler having means for connecting it to a compressor and comprising a hollow generally cylindrical body having an inwardly tapering extremity, a piston reciprocable in said body, a nozzle element carried by said piston, said element having a metallic nipple engaging part capable of making a sealed connection with the nipple with the axis of said element in any one of a plurality of diverse angular positions relative to the axis of the nipple, and a clamping mechanism operated by lubricant pressure for securely holding the nipple engaging part of said element in sealing engagement with the nipple.

4. In a high pressure lubricating system, the combination of a fitting for receiving lubricant, a high pressure lubricant compressor, a coupler for making a sealed connection between said compressor and said fitting, said coupler having lubricant pressed means for mechanically clamping the coupler to the fitting and having a lubricant conducting passageway, a check valve positioned in said passageway permitting flow of lubricant from said compressor to said fitting and preventing flow in the reverse direction, and a continuously open high resistance by-pass around said check valve.

5. High pressure lubricating apparatus comprising, a fitting for receiving lubricant and having means for securing it to a part to be lubricated, a source of lubricant under pressure, and lubricant pressure-operated coupling means for connecting said source to said fitting, said last named means including a passageway having a check valve therein opening in a direction to permit flow from said source to the fitting and having a continuously open by-pass around said check valve, said by-pass being of relatively great length and small cross-sectional area.

6. A coupler for a high pressure lubricating apparatus comprising a body having a cylindrical bore therein and having an inwardly tapered surface at the extremity thereof, a tubular nozzle element having lubricant-fitting contacting parts, a slidable annular packing between said nozzle and said body, a plurality of clamping jaws arranged to be forced inwardly about the head of a lubricant-receiving fitting upon application of lubricant pressure to said packing, and a spring between said nozzle element and said jaws to retract the latter from clamping position.

7. A coupler for making a quick detachable lubricant pressure locked connection with a lubricant-receiving fitting forming part of a high pressure lubricant system, comprising a fitting-engaging-sealing member, clamping mechanism for detachably holding said member against a fitting, a sleeve surrounding said clamping mechanism and said member, and a piston within said sleeve and slidable on said member and arranged upon application of lubricant pressure to operate said clamping mechanism.

8. An automatically operable lubricant pressure operated coupler for high pressure lubricating apparatus, comprising a body having a camming surface and a cylinder therein, a piston reciprocable in said cylinder, a contactor for making a universal lubricant-tight connection with a receiving fitting slidable relative to said piston, and a plurality of clamping jaws cooperable with said camming surface upon application of lubricant pressure to said piston to lock the coupler to a lubricant-receiving fitting in any one of a plurality of angular positions.

9. In a high pressure lubricating system, the combination of a headed lubricant-receiving fitting, and a coupler for making a detachable lubricant-tight connection with said fitting, said coupler comprising a body having a bore therein, clamping devices, a piston, and an element for making a sealed contact with the fitting, said clamping device, said piston, and said element being slidable relative to each other and operable upon application of lubricant pressure to said body to make a detachable lubricant-tight connection with the fitting.

10. A coupler for high pressure lubricating apparatus comprising, a cylinder constructed and arranged to be connected to a source of lubricant capable of being placed intermittently under high pressure, a piston reciprocable in said cylinder, means actuated by said piston upon flow of lubricant under high pressure to said cylinder mechanically to clamp said coupler to a lubricant-receiving fitting, a check valve intermediate said source and said cylinder permitting substantially free flow from said source to said cylinder, and means offering high resistance to lubricant flow and forming a constantly open by-pass around said check valve and permitting restricted flow in either direction at all times.

11. In a high pressure lubricating system, the combination of a fitting for receiving lubricant, a coupler for making a detachable connection between a lubricant compressor and said fitting, said coupler comprising a sleeve, a nozzle reciprocably mounted in said sleeve, a piston secured to said nozzle, a plurality of jaws interposed between said nozzle and said sleeve, said sleeve and said jaws having interengaging camming surfaces whereby as said jaws are forced outwardly they will be cammed inwardly by said sleeve, and an expansible split ring spring engaging the inner surfaces of said jaws to hold said jaws against the inner walls of said sleeve.

12. In a high pressure lubricating system, the combination of a lubricant-receiving fitting having a head and neck portion, said head portion terminating in a tip having an end face bounded by a circular edge, a lubricant pressed nozzle having a concave metallic surface for sealing engagement with said circular edge in any one of a plurality of angular positions, clamping jaws associated with said nozzle for engaging beneath the head of said fitting thereby to hold said nozzle against the fitting and an annular piston surrounding said nozzle and movable relative thereto upon application of lubricant pressure to force said jaws into nipple-engaging position.

13. In a high pressure lubricating apparatus, in combination with a headed fitting for receiving lubricant and a high pressure lubricant compressor, said fitting having a contact face surrounded by a dirt cutting edge, a coupler for making a quick detachable connection with said fitting comprising, a sleeve having an inwardly tapering surface at its outer end, jaws within said sleeve having surfaces cooperable with said inwardly tapering surface of said sleeve, a nozzle plunger having a spherically concave contact surface for making a sealing connection with the fitting, the cross sectional area of said plunger being greater than the area of the contact face of said fitting, an annular piston surrounding said nozzle and reciprocable in said sleeve, said piston being of greater area than the area of the contact face of said fitting, said piston being engageable with said jaws upon application of lubricant pressure to force said jaws outwardly against said inwardly tapering surface of said sleeve thereby to cam the jaws into clamping engagement about the head of the fitting.

14. In a high pressure lubricating system, a clamping discharge nozzle comprising a body having a cylindrical bore therein and an inwardly tapering end portion, an annular piston reciprocable in said bore, a tubular nozzle element slidable in said piston, means to limit relative movement of said piston and said element, and a plurality of clamping jaws mounted for sliding movement between said nozzle element and said body and arranged to be forced into clamping engagement with a lubricant receiving fitting by the tapering end portion of said body.

15. In combination, a source of lubricant under pressure, pumping mechanism supplied with lubricant from said source and operable at will to eject lubricant under high pressure, a lubricant receiving fitting having an enlarged head, a coupler connected to said mechanism, said coupler including lubricant pressure operated means engageable about the head of said fitting tightly to clamp the coupler thereto, and automatically operable means associated with said coupler for rapidly relieving the lubricant pressure therein upon cessation of operation of said pumping mechanism, said means including a highly restricted passageway open at all times for the escape of lubricant from said coupler toward said source.

16. In combination, a source of lubricant under pressure, pumping mechanism supplied with lubricant from said source and operable to eject lubricant under high pressure, a lubricant receiving fitting having an enlarged head, a coupler connected to said mechanism, said coupler including lubricant pressure operated means engageable about the head of said fitting tightly to clamp the coupler thereto, and a highly restricted passageway between said coupler and said source open at all times for relieving the lubricant pressure in said coupler.

17. In combination, a source of lubricant under pressure, pumping mechanism supplied with lubricant from said source and operable to eject lubricant under high pressure, a lubricant receiving fitting having an enlarged head, a coupler connected to said mechanism, said coupler including lubricant pressure operated means engageable about the head of said fitting tightly to clamp the coupler thereto, and a check valve at the inlet end of said coupler, and a constantly open highly restricted passageway by-passing said check valve.

18. In combination, a source of lubricant under pressure, pumping mechanism supplied with lubricant from said source and operable to eject lubricant under high pressure, a lubricant receiving fitting having an enlarged head, a coupler connected to said mechanism, said coupler including lubricant pressure operated means engageable about the head of said fitting tightly to clamp the coupler thereto, an apertured plug secured at the inlet end of said coupler, and a check valve normally closing said aperture, the engaging surfaces of said plug and coupler defining a highly restricted passageway by-passing said check valve.

19. In high pressure lubricating apparatus, the combination of a source of lubricant under pressure, a lubricant receiving fitting, a lubricant pressure actuated coupler for detachably connecting said source with said fitting, a check valve associated with said coupler and in the path of flow of lubricant from said source to said fitting, and a constantly open restricted passageway by-passing said check valve for relieving the pressure in said coupler.

20. In combination, a lubricant receiving fitting having a tip bounded by a circular dirt-cutting edge, a coupler having lubricant pressure operated means for mechanically securing it to said fitting, and a lubricant pressed sealing part mounted in said coupler and having a spherically concave metallic contact surface arranged to be pressed against the circular edge of said fitting and seal thereagainst when said coupler is mechanically secured to said fitting with its axis in any one of a plurality of angular positions relative to the axis of the fitting, the cross sectional area of said sealing part subjected to lubricant pressure being substantially greater than the area of said fitting which is bounded by the circular dirt cutting edge.

21. In combination, a lubricant receiving fitting having a tip bounded by a circular dirt-cutting edge, a coupler having means for mechanically securing it to said fitting, and a lubricant pressed sealing part mounted for reciprocation in said coupler and having a metallic contact surface shaped for sealing engagement with the circular edge of said fitting, the area of said sealing part subjected to lubricant pressure being substantially greater than the area of the tip of the fitting bounded by said dirt cutting edge.

22. In combination, a lubricant compressor having a low pressure chamber, a high pressure cylinder, a high pressure plunger reciprocable in said cylinder and withdrawable therefrom to effect communication between said cylinder and said chamber, and means for relatively reciprocating said cylinder and plunger; a lubricant receiving fitting having a head portion, a coupler connected to said cylinder to receive lubricant therefrom, said coupler including lubricant pressure operated means to clamp it to the head portion of said fitting, and means located between said clamping means and said high pressure cylinder and forming a high resistance by-pass for lubricant in one direction while permitting relatively free flow in the opposite direction.

23. In a high pressure lubricating system, the combination of a lubricant compressor, lubricant-receiving nipples having means for attachment to parts to be lubricated, and a coupler connected to said compressor and constructed and arranged to be detachably connected successively to said nipples, said coupler comprising a hollow generally cylindrical body having an inwardly tapering extremity, a piston reciprocable in said body, a nozzle element carried by said piston, said element having a nipple engaging part capable of making a sealed connection with the end of the nipple with the axis of said element in any one of a plurality of diverse angular positions relative to the axis of the nipple, and a clamping mechanism operated by lubricant pressure within said cylindrical body for securely holding the nipple engaging part of said element in sealing engagement with said nipple.

24. In a high pressure lubricating system, the combination of a lubricant compressor, a lubricant receiving fitting having head and neck portions, and a coupler for making a detachable lubricant tight connection between said compressor and said fitting, said coupler comprising a hollow generally cylindrical body having an inwardly projecting camming surface, a plurality of jaws engageable with said camming surface, confined within said body and conformed to engage about the neck of said fitting and permit limited universal movement of the coupler relative to the fitting without breaking the coupling connection, each of said jaws being capable of movement independently of the other jaws whereby when the coupler is swung through an angle greater than a predetermined angle the coupler may be easily removed from the fitting, and a nozzle part having a lubricant conducting passageway extending therethrough, said nozzle part having its outer end conformed to make a universal lubricant-tight connection with the end of said fitting and having its inner end exposed to lubricant pressure in said body, whereby the effectiveness of its sealing contact with the fitting will increase with increased lubricant pressure.

25. In a high pressure lubricating system, the combination of a lubricant compressor, a lubricant receiving fitting constructed for attachment to a part to be lubricated, a coupler having means for connecting it to said compressor, said coupler comprising a hollow substantially cylindrical body having a bore tapering inwardly at its fitting engaging end, a nozzle element reciprocable in said body, said nozzle element having a passageway extending therethrough and having seal-forming means for making lubricant-tight connection with the end of said fitting when the coupler and fitting are coupled together with their axes in any one of a plurality of angular relationships, the inner end of said nozzle element having an effective area exposed to the pressure of lubricant in said body which is substantially greater than the area of the seal forming means which is exposed to lubricant pressure, whereby the lubricant pressure will hold the nozzle element in sealing contact with the fitting, and a plurality of jaws confined within said body surrounding said nozzle element and engageable with said fitting beneath the head thereof in any one of said plurality of angular relationships.

26. In a high pressure lubricating system, the combination of a tubular lubricant receiving fitting having one end adapted for attachment to a bearing part, an inlet end of smaller diameter than said first-mentioned end, and a neck of smaller diameter than said inlet end, a coupler comprising a hollow substantially cylindrical body having a bore tapering inwardly at its fitting engaging end, a nozzle element reciprocable in said body, said nozzle element having a passageway extending therethrough and having a fitting-engaging part, said fitting and nozzle having metallic surfaces conformed to provide an engagement therebetween of a circular edge with a substantially hemispherical surface, a piston for pressing said nozzle against said fitting, lubricant pressure operated clamping jaws between said nozzle and said body and cammed inward to engage the neck of the fitting by the tapered portion of said bore, and a lubricant compressor connected to said nozzle for supplying lubricant thereto in sufficient quantity and at sufficient pressure to cause said piston to effect a seal between said nozzle and fitting and to actuate said jaws to grip said neck.

JOSEPH BYSTRICKY.